Patented Sept. 25, 1951

2,568,994

UNITED STATES PATENT OFFICE

2,568,994

PURIFICATION OF PARA-CAPROYLAMINO-BENZENESULFONHYDROXAMIDE

Charles M. Eaker, Affton, and Ferdinand B. Zienty, Brentwood, Mo., assignors to Monsanto Chemical Company, St. Louis, Mo., a corporation of Delaware No Drawing. Application February 14, 1949, Serial No. 76,408

6 Claims. (Cl. 260—397.7)

This invention relates to para-caproylaminobenzenesulphonhydroxamide; more particularly this invention relates to an improvement in the process for the purification of crude para-caproylaminobenzenesulphonhydroxamide.

Para - caproylaminobenzenesulphonhydroxamide is a valuable material for the treatment of various bacterial infections. In such applications it is necessary that para-caproylaminobenzenesulphonhydroxamide be of the highest degree of purity. Para-caproylaminobenzenesulphonhydroxamide is generally prepared by the reaction of one mol of para-caproylaminobenzenesulfonyl chloride with about one and one-half mols of hydroxylamine hydrochloride in a pyridine medium. The crude crystals of para-caproylaminobenzenesulphonhydroxamide are filtered from the reaction medium and then recrystallized from a suitable organic solvent such as a mixture of water and alcohol. The thus purified crystals of para-caproylaminobenzenesulphonhydroxamide heretofore have then been air or vacuum dried at elevated temperatures. According to the aforementioned procedure, the recrystallization of para-caproylaminobenzene sulphonhydroxamide results in the formation of exceedingly unstable crystals which decompose during the subsequent drying operation. This decomposition is indicated by the evolution of brown fumes of oxides of nitrogen, a yellow or brown discoloration of the product and a lowering of the melting point of the finished material, thereby producing a material which is of such a low degree of purity that it is not suitable for use in the treatment of bacterial infections.

It is an object of this invention to provide an improved process for the purification of para-caproylaminobenzenesulphonhydroxamide.

It is a further object of this invention to provide an improvement in the process for the purification by recrystallization of para-caproylaminobenzenesulphonhydroxamide whereby the resulting crystals of para-caproylaminobenzenesulphonhydroxamide do not decompose during the final drying operation and possess exceptional purity.

Further objects will become apparent from the description of the novel process of this invention and the claims.

It has now been discovered that para-caproylaminobenzenesulphonhydroxamide crystals which have been recrystallized from a suitable organic solvent will not decompose during the final drying operation, which may be carried out either in air or in vacuum at elevated temperatures, if these crystals have been intimately contacted with a liquid medium having dispersed therein an alkaline salt of an alkali metal. By alkaline salt is meant a salt whose aqueous solution has a pH of greater than 7.0.

The novel process of this invention may be carried out in any manner that will afford an intimate contact between the recrystallized para-caproylaminobenzenesulphonhydroxamide and the alkaline salts. However, the preferred and most convenient methods of accomplishing this result are by dissolving and recrystallizing crude para - caproylaminobenzenesulphonhydroxamide in a suitable organic solvent which has dissolved or dispersed therein an alkaline salt, or by merely filtering para-caproylaminobenzenesulphonhydroxamide that has been recrystallized from an organic solvent and washing the crystals with a solution having dissolved therein an alkaline salt. Typical of the organic solvents which may be utilized are ethyl alcohol, methyl alcohol, isopropyl alcohol, acetone and mixtures of these solvents with water. Any of the alkaline salts of the alkali metals may be utilized such as sodium acetate, potassium propionate, sodium bicarbonate, potassium carbonate and others.

The quantity of the alkaline salt utilized is not critical as the essence of the invention is the incorporation or dispersion of the alkaline salts throughout the crystals of para-caproylaminobenzenesulphonhydroxamide prior to drying and even minor amounts of the alkaline salts significantly increase the stability of the treated product. After drying the composition consists essentially of para - caproylaminobenzenesulphonhydroxamide having intimately dispersed therein a minor amount of an alkaline salt of an alkali metal.

*Example I*

Crude crystals of p-caproylaminobenzenesulphonhydroxamide were prepared by the condensation of one mol of p-caproylaminobenzenesulphonyl chloride with one and one-half mols of hydroxylamine hydrochloride in the presence of pyridine. A portion of these crystals was dissolved and recrystallized in a 75% by volume ethyl alcohol solution. In accordance with conventional procedures, the recrystallized material was filtered and washed with two portions of a 50% by volume ethyl alcohol solution followed by washing with two portions of distilled water and dried under vacuum at 50° C.

During drying there was a noticeable evolution of brown fumes of oxides of nitrogen indicating severe decomposition. The dried product was yellow in color. The product had decomposed to such an extent that accurate melting point determinations were impossible, and the material was totally unsuitable for any practical use.

*Example II*

A portion of the crude p-caproylaminobenzenesulphonhydroxamide crystals prepared in Example I was dissolved and recrystallized in a 75% by volume isopropyl alcohol solution. The recrystallized material was filtered and washed with two portions of a 50% isopropyl alcohol solution followed by washing with two portions of a 5% by weight solution of sodium acetate. The crystals were then dried in air at 70° C. During drying there was no evidence of decomposition and the resultant material, which consisted essentially of para-caproylaminobenzenesulphonhydroxamide having intimately dispersed therein a minor amount of sodium acetate, was white in color with a melting point of 180° to 182° C.

*Example III*

A portion of the crude p-caproylaminobenzenesulphonhydroxamide crystals prepared in Example I was dissolved and recrystallized in a 75% by volume ethyl alcohol solution. The recrystallized material was filtered and washed with two portions of a 50% ethyl alcohol solution followed by washing with a 3% solution of sodium bicarbonate. The crystals were then dried in vacuum at 50° C. During drying there was no evidence of decomposition and the resultant material, which consisted essentially of para-caproylaminobenzenesulphonhydroxamide having intimately dispersed therein a minor amount of sodium bicarbonate, was white in color with a melting point of 180° to 182° C.

*Example IV*

A portion of the crude p-caproylaminobenzenesulphonhydroxamide crystals prepared in Example I was dissolved and recrystallized in an acetone solution. The recrystallized material was filtered and washed with two portions of acetone followed by washing with a 10% solution of potassium propionate. The crystals were then dried in vacuum at 60° C. During drying there was no evidence of decomposition and the resultant material was white in color and comparable in purity to that prepared in Example III.

*Example V*

A portion of the crude p-caproylaminobenzenesulphonhydroxamide crystals prepared in Example I was dissolved and recrystallized in a 75% by volume ethyl alcohol solution. The recrystallized material was filtered and washed with two portions of a 75% ethyl alcohol solution followed by washing with a 1% solution of sodium carbonate. The crystals were then dried in vacuum at about 50° C. During drying there was no evidence of decomposition and the resultant material was white in color with a melting point of 180° to 182° C.

*Example VI*

A portion of the crude p-caproylaminobenzenesulphonhydroxamide crystals prepared in Example I was dissolved and recrystallized in 1,000 ml. of a 75% by volume ethyl alcohol solution that had dissolved therein 6.0 g. of sodium acetate. The crystals were filtered, washed twice with water and then dried in vacuum at about 50° C. During drying there was no evidence of decomposition and the resultant material was white in color having a melting point of 180° to 182° C.

*Example VII*

A portion of the crude p-caproylaminobenzenesulphonhydroxamide crystals prepared in Example I was dissolved and recrystallized in 500 ml. of a 75% by volume methyl alcohol solution having dissolved therein 3.0 g. of sodium bicarbonate. The crystals were filtered and washed with water and dried in vacuum at about 65° C. with no evidence of decomposition. The resultant material was white in color and comparable to that prepared in Example VI.

What is claimed is:

1. The process for the purification of crude para-caproylaminobenzenesulphonhydroxamide comprising the recrystallization of crude para-caproylaminobenzenesulphonhydroxamide from an inert organic solvent, filtering the recrystallized para-caproylaminobenzenesulphonhydroxamide crystals, washing the crystals with a solution of an alkaline salt of alkali metal in an inert solvent and drying the crystals of para-caproylaminobenzenesulphonhydroxamide at a temperature in the range of from about 30° C. to about 100° C.

2. The process for the purification of crude para-caproylaminobenzenesulphonhydroxamide comprising recrystallizing crude para-caproylaminobenzenesulphonhydroxamide from an inert organic solvent which has dispersed therein an alkaline salt of an alkali metal, filtering the recrystallized para-caproylaminobenzenesulphonhydroxamide, washing the filtered para-caproylaminobenzenesulphonhydroxamide with water and drying the crystals of para-caproylaminobenzenesulphonhydroxamide at a temperature in the range of from about 30° C. to about 100° C.

3. In the process for the purification by recrystallization of para-caproylaminobenzenesulphonhydroxamide, the step comprising recrystallizing crude para-caproylaminobenzenesulphonhydroxamide from an inert organic solvent which has dispersed therein an alkaline salt of an alkali metal.

4. The process as described in claim 3, wherein the alkaline salt is sodium acetate.

5. The process as described in claim 3, wherein the alkaline salt is sodium bicarbonate.

6. In a process of drying para-caproylaminobenzenesulphonhydroxamide the step comprising contacting para-caproylaminobenzenesulphonhydroxamide with an inert liquid medium having dispersed therein an alkaline salt of an alkali metal immediately prior to drying.

CHARLES M. EAKER.
FERDINAND B. ZIENTY.

REFERENCES CITED

The following references are of record in the file of this patent:

UNITED STATES PATENTS

| Number | Name | Date |
|---|---|---|
| 2,097,415 | Kharasch et al. | Oct. 26, 1937 |
| 2,260,632 | Moore et al. | Oct. 28, 1941 |

OTHER REFERENCES

Moore et al., "J. Am. Chem. Soc." vol. 62, August 1940, pp. 2097 to 2099.

Kohl et al., "Proc. Soc. Expt. Biol. and Med." vol. 44, June 1940, pages 455 to 457.